(12) United States Patent
Ye et al.

(10) Patent No.: US 10,997,651 B2
(45) Date of Patent: May 4, 2021

(54) METHOD AND APPARATUS FOR OFFLINE INTERACTION BASED ON AUGMENTED REALITY

(71) Applicant: Advanced New Technologies Co., Ltd., Grand Cayman (KY)

(72) Inventors: Zhongzheng Ye, Hangzhou (CN); Hong Zhang, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/419,905

(22) Filed: May 22, 2019

(65) Prior Publication Data

US 2019/0272588 A1    Sep. 5, 2019

Related U.S. Application Data

(63) Continuation of application No. PCT/CN2018/077550, filed on Feb. 28, 2018.

(30) Foreign Application Priority Data

Mar. 1, 2017   (CN) .......................... 201710119872.3

(51) Int. Cl.
  *G06Q 30/00*    (2012.01)
  *G06Q 30/06*    (2012.01)
  (Continued)

(52) U.S. Cl.
  CPC ..... *G06Q 30/0641* (2013.01); *G06K 9/00671* (2013.01); *G06Q 20/065* (2013.01);
  (Continued)

(58) Field of Classification Search
  CPC ........... G06Q 30/0207; G06Q 30/0226; G06Q 30/0643; G06Q 20/065; G06Q 30/0641;
  (Continued)

(56) References Cited

U.S. PATENT DOCUMENTS 6,871,140 B1 * 3/2005 Florance ................ G06Q 50/16
                                                701/516
7,707,073 B2 * 4/2010 Bloebaum ............... H04W 4/80
                                                705/26.8
(Continued)

FOREIGN PATENT DOCUMENTS

CN           1898664       1/2007
CN         103246988       8/2013
(Continued)

OTHER PUBLICATIONS

"Real Estate Industry sees value in Pokemon Go", Dominion Post (Wellington, New Zealand) Oct. 22, 2016: C. 15 (Year: 2016).*
(Continued)

*Primary Examiner* — Anne M Georgalas
(74) *Attorney, Agent, or Firm* — Fish & Richardson P.C.

(57) ABSTRACT

Augmented reality interaction is described, combining online virtual resource allocation and management with consumption and image scanning operations of a user at a target place. Consumption data of a user is obtained. A quantity of virtual resources corresponding to the user are allocated to the user based on a consumption amount, and then accumulated. A determination is made whether a predetermined identifier corresponding to the target place is identified from image information of a scanned real-world image obtained through image scanning. Virtual data related to the virtual resources in the virtual resource pool is delivered from the augmented reality server to the augmented reality client device. The augmented reality client device is configured to perform augmented display of the related virtual data by overlaying and combining the virtual data with the image information at a location corresponding to the predetermined identifier in the scanned real-world image.

15 Claims, 7 Drawing Sheets

(51) Int. Cl.
  *G06K 9/00* (2006.01)
  *G06Q 20/06* (2012.01)
  *H04L 29/06* (2006.01)
  *G06Q 30/02* (2012.01)
(52) U.S. Cl.
  CPC ..... *G06Q 30/0207* (2013.01); *G06Q 30/0226* (2013.01); *G06Q 30/0643* (2013.01); *H04L 67/38* (2013.01); *G06K 2209/25* (2013.01)
(58) Field of Classification Search
  CPC . G06K 9/00671; G06K 2209/25; H04L 67/38
  See application file for complete search history.

(56) References Cited

U.S. PATENT DOCUMENTS

| | | | |
|---|---|---|---|
| 8,743,145 B1* | 6/2014 | Price | G06F 16/954 345/633 |
| 8,758,136 B2* | 6/2014 | Briggs | A63F 13/25 463/39 |
| 8,803,916 B1* | 8/2014 | Paczkowski | G06T 11/60 345/633 |
| 8,810,599 B1* | 8/2014 | Tseng | G05D 1/0246 345/633 |
| 9,031,328 B2* | 5/2015 | Schonfeld | G06K 9/00523 382/209 |
| 9,606,992 B2* | 3/2017 | Geisner | G09G 3/003 |
| 10,346,924 B1* | 7/2019 | Engelhorn | G06Q 40/08 |
| 2003/0040964 A1* | 2/2003 | Lacek | G06Q 30/02 705/14.14 |
| 2009/0204600 A1* | 8/2009 | Kalik | G01C 21/30 |
| 2009/0300100 A1 | 12/2009 | Freer | |
| 2012/0044263 A1* | 2/2012 | Kim | G06F 16/583 345/633 |
| 2012/0086727 A1* | 4/2012 | Korah | G06F 3/03 345/633 |
| 2012/0268286 A1 | 10/2012 | Jin et al. | |
| 2013/0147839 A1* | 6/2013 | Fukushima | G06Q 30/06 345/633 |
| 2014/0052585 A1* | 2/2014 | Ito | G06Q 30/0635 705/26.81 |
| 2014/0214547 A1* | 7/2014 | Signorelli | G06Q 30/0267 705/14.64 |
| 2014/0225924 A1 | 8/2014 | Loxam et al. | |
| 2015/0095456 A1* | 4/2015 | Shah | G06F 16/13 709/217 |
| 2016/0071140 A1* | 3/2016 | Sherman | G06Q 30/0226 705/14.27 |
| 2016/0163000 A1* | 6/2016 | Calman | G06K 9/00744 705/26.8 |
| 2017/0039613 A1 | 2/2017 | Kaehler et al. | |
| 2018/0150903 A1* | 5/2018 | Waldron | G06Q 30/0641 |

FOREIGN PATENT DOCUMENTS

| | | |
|---|---|---|
| CN | 103959325 | 7/2014 |
| CN | 104081379 | 10/2014 |
| CN | 104408647 A * | 3/2015 |
| CN | 104463623 | 3/2015 |
| CN | 104813356 | 7/2015 |
| CN | 105096180 | 11/2015 |
| CN | 105354203 | 2/2016 |
| CN | 105637549 | 6/2016 |
| CN | 105787757 | 7/2016 |
| CN | 105809459 | 7/2016 |
| CN | 106097003 | 11/2016 |
| CN | 106228400 | 12/2016 |
| CN | 106326454 | 1/2017 |
| CN | 106372965 | 2/2017 |
| CN | 107123013 | 9/2017 |
| EP | 2544138 | 1/2013 |
| JP | H11250132 | 9/1999 |
| JP | 2002073878 | 3/2002 |
| JP | 2002073988 | 3/2002 |
| JP | 2004220426 | 8/2004 |
| JP | 2014127148 | 7/2014 |
| JP | 2015079371 | 4/2015 |
| JP | 2016039599 | 3/2016 |
| JP | 2017041227 | 2/2017 |
| WO | WO 2013144430 | 10/2013 |
| WO | WO 2015195413 | 12/2015 |

OTHER PUBLICATIONS

"Moving the future: organic motion joins other high-tech companies to help Intel open our eyes to the future," Computer Graphics World, 31:2: 36, PennWell Publishing Co. (Feb. 2008) (Year: 2008).*
Extended European Search Report in European Application No. 18761363.3, dated Nov. 8, 2019, 9 pages.
PCT International Preliminary Report on Patentability in International Application No. PCT/CN2018/077550, dated Sep. 3, 2019, 10 pages (with English translation).
Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.
Jeon Jong-heon, "Shinhan Card, Service for Searching Benefits of Augmented Reality-linked Member Stores", Seoul Finance, Apr. 28, 2010, 4 pages (with English translation).
PCT International Search Report and Written Opinion in International application No. PCT/CN2018/077550, dated May 22, 2018, 10 pages (with partial English Translation).

* cited by examiner

METHOD AND APPARATUS FOR OFFLINE INTERACTION BASED ON AUGMENTED REALITY

CROSS-REFERENCE TO RELATED APPLICATIONS

This application is a continuation of PCT Application No. PCT/CN2018/077550, filed on Feb. 28, 2018, which claims priority to Chinese Patent Application No. 201710119872.3, filed on Mar. 1, 2017, and each application is hereby incorporated by reference in its entirety.

TECHNICAL FIELD

The present application relates to the field of augmented reality, and in particular, to an offline interaction method and apparatus based on augmented reality.

BACKGROUND

Augmented reality (AR) technology is a technology where corresponding pictures, videos, and three-dimensional (3D) models are combined on an image by calculating a location and an angle of the image in real time, to integrate a virtual world with a real world, thereby providing users with a new interaction experience. With the continuous development of AR technology, AR technology is being applied more widely. Therefore, how to combine online services with offline services better by using AR technology is important to improve user experience.

SUMMARY

The present application provides an offline interaction method based on augmented reality. The method is applied to an augmented reality server, and includes the following: obtaining consumption data of a user at a target place, where the consumption data includes a consumption amount; allocating a corresponding quantity of virtual resources to the user based on the consumption amount, and accumulating the allocated virtual resources to a virtual resource pool of the target place; in response to an image scanning operation performed by an augmented reality client device in an offline environment of the target place, determining whether a predetermined identifier corresponding to the target place is identified from image information obtained through scanning; and in response to determining that the predetermined identifier corresponding to the target place is identified from the image information obtained through scanning, delivering virtual data related to virtual resources in the virtual resource pool to the augmented reality client device, so that the augmented reality client device performs augmented display on the related virtual data at a location corresponding to the predetermined identifier in a scanned real-world image.

The present application further provides an offline interaction method based on augmented reality. The method is applied to an augmented reality client device, and includes the following: uploading consumption data of a user at a target place to an augmented reality server, where the consumption data includes a consumption amount, so that the augmented reality server allocates a corresponding quantity of virtual resources to the user based on the consumption amount, and accumulates the allocated virtual resources to a virtual resource pool of the target place; performing image scanning in an offline environment of the target place in response to an image scanning operation performed by the user in the offline environment of the target place; initiating image recognition on image information obtained through scanning, and when a predetermined identifier corresponding to the target place is identified from the image information, receiving virtual data that is delivered by the augmented reality server and that is related to virtual resources in the virtual resource pool; and performing augmented display on the received virtual data at a location corresponding to the predetermined identifier in a scanned real-world image.

The present application further provides an offline interaction apparatus based on augmented reality. The apparatus is applied to an augmented reality server, and includes the following: an acquisition module, configured to obtain consumption data of a user at a target place, where the consumption data includes a consumption amount; an allocation module, configured to allocate a corresponding quantity of virtual resources to the user based on the consumption amount, and accumulate the allocated virtual resources to a virtual resource pool of the target place; a determining module, configured to: in response to an image scanning operation performed by an augmented reality client device in an offline environment of the target place, determine whether a predetermined identifier corresponding to the target place is identified from image information obtained through scanning; and a delivering module, configured to: in response to determining that the predetermined identifier corresponding to the target place is identified from the image information obtained through scanning, deliver virtual data related to virtual resources in the virtual resource pool to the augmented reality client device, so that the augmented reality client device performs augmented display on the related virtual data at a location corresponding to the predetermined identifier in a scanned real-world image.

The present application further provides an offline interaction apparatus based on augmented reality. The apparatus is applied to an augmented reality client device, and includes the following: an uploading module, configured to upload consumption data of a user at a target place to an augmented reality server, where the consumption data includes a consumption amount, so that the augmented reality server allocates a corresponding quantity of virtual resources to the user based on the consumption amount, and accumulates the allocated virtual resources to a virtual resource pool of the target place; a scanning module, configured to perform image scanning in an offline environment of the target place in response to an image scanning operation performed by the user in the offline environment of the target place; a receiving module, configured to initiate image recognition on image information obtained through scanning, and when a predetermined identifier corresponding to the target place is identified from the image information, receive virtual data that is delivered by the augmented reality server and that is related to virtual resources in the virtual resource pool; and a display module, configured to perform augmented display on the received virtual data at a location corresponding to the predetermined identifier in a scanned real-world image.

The present application provides an augmented reality technology-based interaction mode of combining online virtual resource allocation and management with consumption and image scanning operations of a user at an offline target place.

An augmented reality client device can upload consumption data of the user at the offline target place to an augmented reality server, and the augmented reality server can allocate a corresponding quantity of virtual resources to the user based on a consumption amount in the consumption data, accumulate the allocated virtual resources to a virtual resource pool of the target place to convert the consumption data of the user at the offline target place into the corresponding quantity of virtual resources, and accumulate virtual resources allocated to different users to the virtual resource pool of the target place, thereby selecting a good offline target place by horizontally comparing and analyzing total quantities of virtual resources accumulated in virtual resource pools of different target places.

In addition, when arriving at the offline target place, in addition to regular consumption at the target place, the user can scan an offline environment of the target place by using the augmented reality client device. The augmented reality client device can initiate image recognition on image information obtained through scanning; when a predetermined identifier corresponding to the target place is identified from the image information obtained through scanning, receive virtual data that is delivered by the augmented reality server and that is related to virtual resources of the target place; and perform augmented display on the received virtual data at a location corresponding to the predetermined identifier in a scanned real-world image, thereby combining online virtual resource management with an offline image scanning operation of the user by using an augmented reality image recognition technology. As such, the user can view related information of the virtual resources in the virtual resource pool of the target place to more conveniently manage the virtual resources allocated to the user.

DESCRIPTION OF IMPLEMENTATIONS

Figure 1:
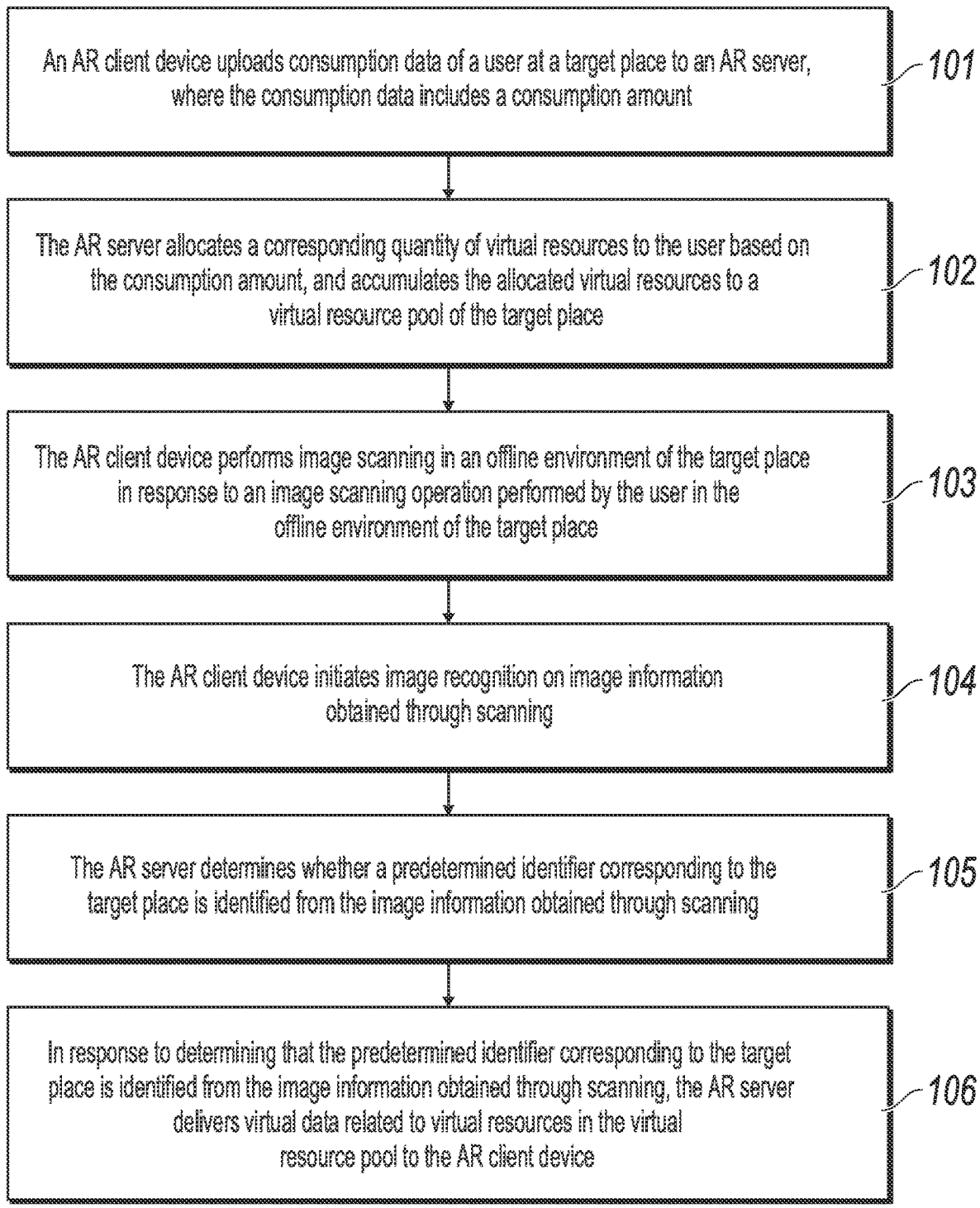
FIG. 1 is a flowchart illustrating an offline interaction method based on augmented reality, according to an implementation of the present application.

The present application provides an AR technology-based interaction mode of combining online virtual resource allocation and management with consumption and image scanning operations of a user at an offline target place. The interaction mode can be classified into online interaction of virtual resource allocation and management, and offline interaction of consumption and image scanning of the user at the target place.

During online interaction, an AR client device can upload consumption data of the user at the offline target place to an AR server, and the AR server can allocate a corresponding quantity of virtual resources to the user based on a consumption amount in the consumption data, accumulate the allocated virtual resources to a virtual resource pool of the target place to convert the consumption data of the user at the offline target place into the corresponding quantity of virtual resources, and accumulate virtual resources allocated to different users to the virtual resource pool of the target place, thereby selecting a good offline target place by horizontally comparing and analyzing total quantities of virtual resources accumulated in virtual resource pools of different target places.

During offline interaction, when arriving at the offline target place, in addition to regular consumption at the target place, the user can scan an offline environment of the target place by using the AR client device. The AR client device can initiate image recognition on image information obtained through scanning; when a predetermined identifier corresponding to the target place is identified from the image information obtained through scanning, receive virtual data that is delivered by the AR server and that is related to virtual resources of the target place; and perform augmented display on the received virtual data at a location corresponding to the predetermined identifier in a scanned real-world image, thereby combining online virtual resource management with an offline image scanning operation of the user by using an AR image recognition technology. As such, the user can view related information of the virtual resources in the virtual resource pool of the target place to more conveniently manage the virtual resources allocated to the user.

For example, in an application scenario, the target place can be any type of offline shops, and the virtual resources can be virtual assets (such as virtual stocks or virtual bonds) corresponding to the offline shop.

In the present scenario, after the user performs offline consumption in the offline shop (for example, completes offline payment by using an APP), the AR client device can interact with the AR server and upload related consumption data to the AR server, and the AR server can allocate a specific quantity of virtual assets of the offline shop to the user based on a current consumption amount of the user, and accumulate the allocated virtual assets to a virtual asset pool of the offline shop. After the allocation is completed, the user obtains the ownership of the virtual assets that permits the user to trade the virtual assets.

In addition, the user can scan a specific identifier (such as a shop logo) of the offline shop by using the AR client device; the AR client device can initiate image recognition on image information obtained through scanning; when the specific identifier is successfully identified from the image information, the AR server can deliver related information (such as total value of virtual assets, unit value, and change data of the unit value) of virtual resources accumulated in the virtual asset pool of the offline shop to the AR client device; and the AR client device performs overlapping display on the related information at a location corresponding to the specific identifier in a scanned real-world image. As such, the user can know a related situation of the virtual assets of the offline shop by using information displayed in the real-world image, to better manage the virtual assets of the offline shop held by the user.

With reference to specific application scenarios, the following describes the present application by using specific implementations.

FIG. 1 illustrates an offline interaction method based on augmented reality, according to an implementation of the present application. The method includes the following steps.

Step 101: An AR client device uploads consumption data of a user at a target place to an AR server, where the consumption data includes a consumption amount.

The AR client device is developed based on an AR technology or integrates an AR function. For example, the AR client device can be ALIPAY that integrates an AR service function. The AR client device is configured to perform image scanning on a real-world scenario in an offline environment; transmit image data obtained through scanning to the AR server in real time; visually render, by using an AR engine at a front end of the AR client device, virtual data pushed by the AR server at a back end; and overlay and combine the virtual data with image data (such as a real-world image) obtained through scanning in the real-world scenario.

The AR server includes a server that serves the AR client device, a server cluster, or a cloud platform built based on a server cluster. For example, the AR server can be a payment platform providing an interworking service for ALIPAY that integrates the AR service function. The AR server is configured to recognize, based on an AR engine at a back end, an image scanned by the AR client device (certainly, the image can also be recognized by the AR client device based on the AR engine at the front end); manage virtual data related to an offline service; and push the related virtual data to the AR client device based on an image recognition result. For example, the AR server can allocate a virtual object to the user based on the image recognition result, and push an allocation result of the virtual object to the AR client device.

The target place can include any type of offline consumption places, for example, offline shops.

In practice, the AR client device can have an offline payment function, and the user can pay for corresponding consumer goods (such as merchandise) offline by using the offline payment function of the AR client device when arriving at the target place with a user terminal device (such as a smartphone) where the AR client device is installed.

In the present example, after the user completes related consumption at the target place, the AR client device can upload current consumption data of the user to the AR server for further processing. The consumption data can include a current consumption amount of the user.

For example, when the user completes consumption in an offline shop by using the payment function of the AR client device, the user can use the AR client device to scan a two-dimensional payment code, etc. provided by a shop owner, to initiate payment to the shop owner and enter a payment amount. In addition, a related payment function module equipped in the AR client device can interact with a related payment platform to complete further payment. After the payment is completed, the AR client device can upload the consumption data related to the current consumption such as a completed order to the AR server.

Step 102: The AR server allocates a corresponding quantity of virtual resources to the user based on the consumption amount, and accumulates the allocated virtual resources to a virtual resource pool of the target place.

The virtual resources can include any form of online virtual resources that can be associated with the consumption amount of the user. The AR server can allocate the corresponding quantity of virtual resources to the user under a preconfigured virtual resource allocation rule based on the consumption amount of the user.

In an implementation, the virtual resources can be virtual assets corresponding to the target place. Specific forms of the virtual assets are not limited in the present application. For example, the virtual assets can be virtual stocks, virtual bonds, virtual options, other forms of virtual assets, etc. in practice.

The virtual resource pool can be a virtual asset pool created for the target place. Virtual resources allocated to different consumers can be accumulated in the virtual resource pool.

For example, in an implementation, the AR server can allocate a unique shop ID to each cooperated offline shop in a system, and chain shops of the same brand can be distinguished by using different shop IDs (or can be not distinguished certainly). In addition, the shop ID of each offline shop can uniquely correspond to a virtual asset ID, and the virtual asset ID can be an ID of a virtual asset account created for the offline shop. After receiving consumption data each time, the AR server can immediately allocate a corresponding quantity of virtual assets to the user based on a consumption amount in the consumption data, and then add the allocated virtual assets to the virtual asset account for accumulation.

In the present example, the AR server can obtain, in real time, the consumption data uploaded by the AR client device. After receiving the consumption data uploaded by the AR client device, the AR server can immediately process the consumption data correspondingly, extract related information such as the consumption amount in the consumption data, and then allocate the corresponding quantity of virtual resources to the corresponding user under a preconfigured virtual resource allocation rule.

Specific allocation logic included in the virtual resource allocation rule is not limited in the present application. When implementing the technical solutions of the present application, a person skilled in the art can perform flexible configuration as needed.

For example, in an implementation, the virtual resource allocation rule can include the following: allocating the same quantity of virtual assets to the user based on a consumption amount. To be specific, the same quantity of virtual assets as a value corresponding to the consumption amount can be allocated to the user based on the value corresponding to the consumption amount.

For another example, in another implementation, there can be a specific linear relationship between a consumption amount and a quantity of virtual assets to be allocated. The virtual resource allocation rule can be a linear function constructed based on the linear relationship. As such, the consumption amount of the user can be input into the linear function as an input parameter for calculation, and the consumption amount is converted into a corresponding quantity of virtual assets to be allocated. Certainly, in practice, the linear relationship can be set as needed, and the quantity of virtual assets to be allocated that is calculated by using the linear function can be greater than or less than the value corresponding to the consumption amount.

After the allocation is completed, the AR server can add the allocated virtual resources to a virtual resource account corresponding to the consumer, update a total quantity of virtual resources in the virtual resource account, and push an update result to the AR client device in a form of a message, so that the AR client device performs synchronous update.

For example, assume that the virtual resources are virtual assets corresponding to the target place. The AR server can create a corresponding virtual asset account for each user, update the allocated virtual assets to the virtual asset account of the related user in real time after allocating the virtual assets, and deliver a corresponding update message to the AR client device to trigger the AR client device to synchronously update a quantity of displayed virtual assets in the virtual resource account of the user.

In addition, the AR server can further accumulate the allocated virtual resources to virtual resources of the target place.

Because a quantity of virtual resources allocated to the user is related to an actual consumption amount of the user, a total quantity and total value of virtual resources accumulated in the virtual resource pool can be finally used as an important indicator for measuring a revenue status of the target place in the present method. To be specific, a larger total quantity of virtual resources in the virtual resource pool indicates a larger quantity of users travelling to the target place for consumption and a larger quantity of consumption times. As such, in practice, a good offline target place with excellent revenue can be "identified" by horizontally comparing and analyzing total quantities and total value of virtual resources accumulated in virtual resource pools of different target places. For example, when the virtual resources are virtual assets and the virtual resource pool is a virtual asset pool, total quantities and total value of virtual assets in virtual asset pools of a plurality of offline shops having basically consistent asset conditions are compared and analyzed to select a good shop with more consumers and a larger quantity of consumption times from such type of offline shops.

Step 103: The AR client device performs image scanning in an offline environment of the target place in response to an image scanning operation performed by the user in the offline environment of the target place.

In the present example, when arriving at the offline target place, in addition to completing offline consumption and obtaining a specific quantity of virtual resources allocated by the AR server by using the payment function of the AR client device, the user can perform image scanning on a predetermined offline identifier of the target place by using an image scanning function of the AR client device.

The offline identifier can be any type of identification information that is described by the AR server at the back end and that is bound with the target place. For example, when the target place is an offline shop, the offline identifier can be a logo of the offline shop.

Step 104: The AR client device initiates image recognition on image information obtained through scanning.

In the present example, after obtaining the corresponding image information from the offline environment of the target place through scanning, the AR client device can initiate image recognition on the image information in real time, to determine whether the image information obtained through scanning includes the offline identifier corresponding to the target place.

The image recognition can be performed on the image information obtained through scanning based on an image recognition model equipped in the AR client device, or can be performed by the AR server based on an image recognition model locally equipped in the AR server after the AR client device uploads the image information obtained through scanning to the AR server in real time.

In an implementation, the AR client device can be locally equipped with an image recognition model. After obtaining the image information of the offline environment of the target place through scanning by invoking a camera of an AR terminal device, the AR client device can continue to invoke the image recognition model to perform image recognition on the image information and upload a recognition result to the AR server. The AR server further confirms the recognition result.

In another implementation, the AR client device can upload the image information obtained through scanning to the AR server in real time without a locally equipped image recognition model, and the AR server performs image recognition on the image information based on the image recognition model locally equipped in the AR server, and then returns a recognition result to the AR client device.

It is worthwhile to note that an image recognition algorithm included in the image recognition model is not limited in the present example. A person skilled in the art can make reference to records in related technologies when implementing the technical solutions of the present application. For example, in an implementation, the image recognition model can be a deep learning model trained based on a neural network and a large quantity of image recognition samples.

Step 105: The AR server determines whether a predetermined identifier corresponding to the target place is identified from the image information obtained through scanning.

Step 106: In response to determining that the predetermined identifier corresponding to the target place is identified from the image information obtained through scanning, the AR server delivers virtual data related to virtual resources in the virtual resource pool to the AR client device.

In the present example, after performing image recognition on the image information obtained through scanning by the AR client device, the AR server can further determine, based on the image recognition result, whether the offline identifier corresponding to the target place is successfully identified from the image information. In response to determining that the offline identifier corresponding to the target place is successfully identified from the image information, the AR server can locally search a database related to the virtual resource pool of the target place for the virtual data related to the virtual resources in the virtual resource pool of the target place.

In an implementation, the virtual data related to the virtual resources in the virtual resource pool of the target place can include total value of the virtual resources in the virtual resource pool, unit value of the virtual resources in the virtual resource pool, change data of the unit value, etc.

For example, when the virtual resources are virtual stocks, the virtual data can include a total price of virtual stocks accumulated in a virtual stock fund pool of the target place, a price per share of the virtual stocks in the virtual stock fund pool, change data of the price per share in a specific period, etc.

Certainly, in practice, other forms of virtual data related to the target place can be introduced into the virtual data in addition to several types of data shown above, for example, a shop location, promotion information of a shop, and shop introduction, and are not listed one by one in the present application.

It is worthwhile to note that the virtual data related to the virtual resources in the virtual resource pool of the target place can be obtained through real-time calculation by the AR server at the back end based on real situations of the virtual resources in the virtual resource pool.

After the AR server accumulates the virtual resources allocated to the user to the virtual resource pool of the target place, the AR server can be immediately triggered to recalculate the virtual data because a total quantity of current virtual resources in the virtual resource pool changes.

The AR server can calculate the unit value of the virtual resources in the virtual resource pool based on a total quantity of virtual resources in the virtual resource pool and total value to be allocated corresponding to the target place. For example, when the virtual resources are virtual assets, the total value to be allocated can be divided by a total quantity of virtual assets in the virtual resource pool to obtain unit value of a virtual asset in each unit share.

The change data of the unit value can include changed unit value and a change moment, so that the AR server can generate time sequence data for the unit value change based on the change moment and the changed unit value.

The total value to be allocated can be an index that can reflect total value of virtual resources to be allocated corresponding to the target place.

For example, in an implementation, when the virtual resources are virtual assets, the total value to be allocated can be total revenue of the target place. In other words, when unit value of virtual assets in the virtual asset pool is being calculated, the total revenue of the target place can be divided by a total quantity of virtual assets in the virtual asset pool to obtain the unit value of the virtual assets.

Certainly, in addition to the total revenue of the target place, the total value to be allocated can be another index that can reflect an asset condition of the target place, for example, total net profit of the target place, total assets evaluated by a third-party evaluation organization or platform on the target place, or total virtual assets to be allocated that are customized for the target place based on the asset condition.

It is worthwhile to note that, in practice, the unit value usually can change dynamically with an operation condition of the target place. As such, the AR server can further immediately record the change data of the unit value through calculation if the unit value of the virtual resources in the virtual resource pool changes.

In addition, after calculating the unit value of the virtual resources in the virtual resource pool, the AR server can further calculate the total value of the virtual resources in the virtual resource pool based on the calculated unit value and the total quantity of virtual resources in the virtual resource pool.

In the present example, the AR server can deliver the virtual data to the AR client device after obtaining the virtual data related to the virtual resources in the virtual resource pool of the target place, and the AR client device performs augmented display on the related virtual data at a location corresponding to the offline identifier in a scanned real-world image.

Step 107: The AR client device performs augmented display on the received virtual data at a location corresponding to the predetermined identifier in a scanned real-world image.

In the present example, after receiving the virtual data delivered by the AR server, the AR client device can visually render the virtual data by using the AR engine at the front end; overlay and combine the virtual data with image data obtained through scanning in the real-world scenario; and perform augmented display at the location corresponding to the offline identifier in the scanned real-world image.

In an implementation, assume that the virtual data includes the total value of the virtual resources in the virtual resource pool, the unit value of the virtual resources in the virtual resource pool, and the change data of the unit value.

Firstly, after receiving the virtual data delivered by the AR server, the AR client device can create a visual graph corresponding to a change rule of the unit value based on the change data of the unit value. For example, the change data of the unit value can be time sequence data generated based on the changed unit value and the moment when the unit value changes, and the visual graph can be a two-dimensional curve generated based on the time sequence data.

Secondly, after creating the visual graph, the AR client device can visually render the visual graph, the total value of the virtual resources in the virtual resource pool, and the unit value of the virtual resources in the virtual resource pool by using the AR engine at the front end, and perform augmented display at the location corresponding to the offline identifier in the scanned real-world image.

Figure 2:
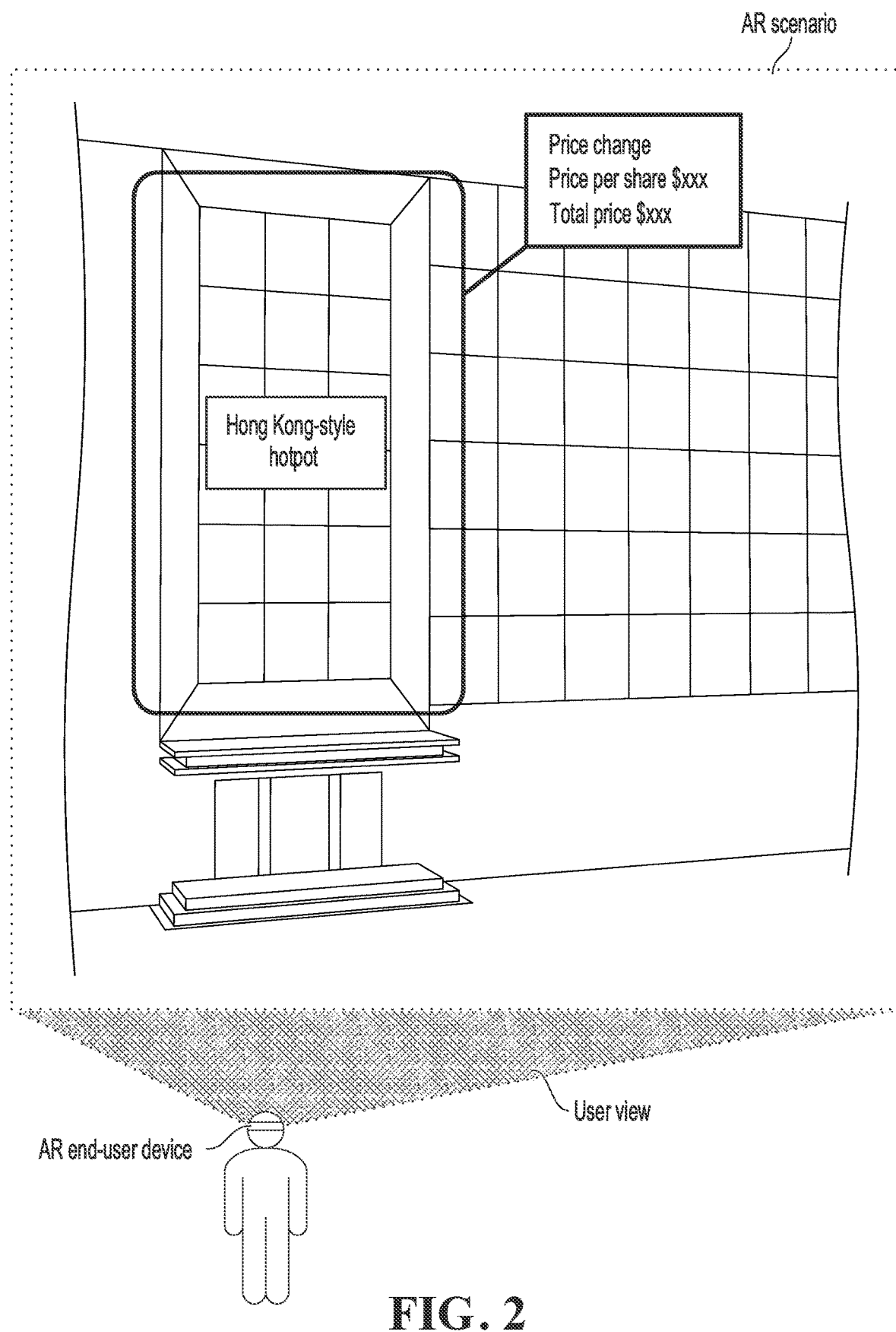
FIG. 2 is a schematic diagram illustrating virtual data output in an AR scenario, according to an implementation of the present application.

For example, referring to FIG. 2, when the target place is an offline shop and the virtual resources are virtual stocks of the offline shop, the virtual data can include a total price of virtual stocks accumulated in a virtual stock fund pool of the shop, a price per share of the virtual stocks in the virtual stock fund pool, and change data of the price per share in a specific period.

After the user scans a logo of the target place by using the AR client device, the AR server can deliver the virtual data to the AR client device. After receiving the virtual data, the AR client device can first visually render the change data of the price per share in the specific period, convert the change data of the price per share in the specific period into a two-dimensional curve that can reflect a price change, and then perform augmented display on data such as the two-dimensional curve, the total price of the virtual stocks accumulated in the virtual stock fund pool of the shop, and the price per share of the virtual stocks in the virtual stock fund pool at a location corresponding to the logo of the shop in a scanned real-world image.

It can be seen that, in the present method, online virtual resource management is combined with an offline image scanning operation performed by the user by using an AR image recognition technology, so that the user can view related information of the virtual resources in the virtual resource pool of the target place by scanning the offline identifier corresponding to the target place by using the AR client device, to more conveniently manage the virtual resources allocated to the user.

In the present example, a user interface of the AR client device can further provide user entries for managing the virtual resources allocated to the user.

In an implementation, the user entries can include a first exchange entry and a second exchange entry. The first exchange entry can be used to exchange the virtual resources allocated to the user with corresponding virtual vouchers, and the second exchange entry can be used to exchange virtual vouchers held by the user with virtual resources.

For example, when the virtual resources are virtual assets, the first exchange entry can be a virtual asset purchase entry, and the second exchange entry can be a virtual asset selling entry. A virtual resource exchange request sent when the AR client device is triggered by the user at the first exchange entry can be a virtual resource purchase request, and a virtual resource exchange request sent when the AR client device is triggered by the user at the second exchange entry can be a virtual resource selling request. The virtual vouchers can be virtual currency used to settle virtual asset purchase and selling. In an initial state, the AR server can further create a virtual currency account for each user to manage held virtual currency. As such, the user can sell held virtual assets by triggering the selling entry, and settle the held virtual assets as virtual currency. Or the user can purchase virtual resources by triggering the purchase entry, and settle held virtual currency as virtual assets.

When detecting a trigger operation (such as a tap operation) performed by the user on the first exchange entry, the AR client device can input a virtual resource exchange interface to the user by using the user interface, and output virtual resources currently held by the user in the virtual resource exchange interface. The user can select corresponding virtual resources on the interface as virtual resources to be exchanged, and enter a quantity of virtual resources to be exchanged.

The AR client device can obtain, at the back end, identification information (such as virtual resource IDs) of the virtual resources to be exchanged that are selected by the user, and the entered quantity of virtual resources to be exchanged; construct a virtual resource exchange request (namely, a first virtual resource exchange request) based on the obtained information; and then send the virtual resource exchange request to the AR server.

After receiving the virtual resource exchange request, the AR server can obtain the identification information and the quantity of virtual resources to be exchanged that are included in the virtual resource exchange request, and calculate total value of the virtual resources to be exchanged. After the calculation is completed, the AR server can allocate virtual vouchers having the same total value as the virtual resources to be exchanged to the user, add the allocated virtual vouchers to a virtual voucher account created for the user, and push an exchange result to the AR client device in a form of a message, to display the result to the user by using the user interface.

Correspondingly, when detecting a trigger operation performed by the user on the second exchange entry, the AR client device can input a virtual resource exchange interface to the user by using the user interface, and output virtual resources to be exchanged by the user currently on the virtual resource exchange interface. The user can select corresponding virtual resources on the interface as virtual resources to be exchanged, and enter a quantity of virtual vouchers to be exchanged.

The AR client device can obtain, at the back end, identification information of the virtual resources to be exchanged that are selected by the user, and the entered quantity of virtual vouchers to be exchanged; construct a virtual resource exchange request (namely, a second virtual resource exchange request) based on the obtained information; and then send the virtual resource exchange request to the AR server.

After receiving the virtual resource exchange request, the AR server can obtain the identification information and the quantity of virtual resources to be exchanged that are included in the virtual resource exchange request, and calculate a quantity of virtual resources having the same total value as the virtual vouchers to be exchanged. After the calculation is completed, the AR server can allocate a corresponding quantity of virtual resources to the user, add the allocated virtual resources to a virtual resource account created for the user, and push an exchange result to the AR client device in a form of a message, to display the exchange result to the user by using the user interface.

It can be seen that, in the present method, the user can conveniently exchange held virtual resources and virtual vouchers as needed after knowing related conditions of the virtual resources in the virtual resource pool of the target place in real time by viewing related information of the virtual resources in the virtual resource pool of the target place.

Corresponding to the previously described method implementation, the present application further provides an apparatus implementation.

Figure 3:
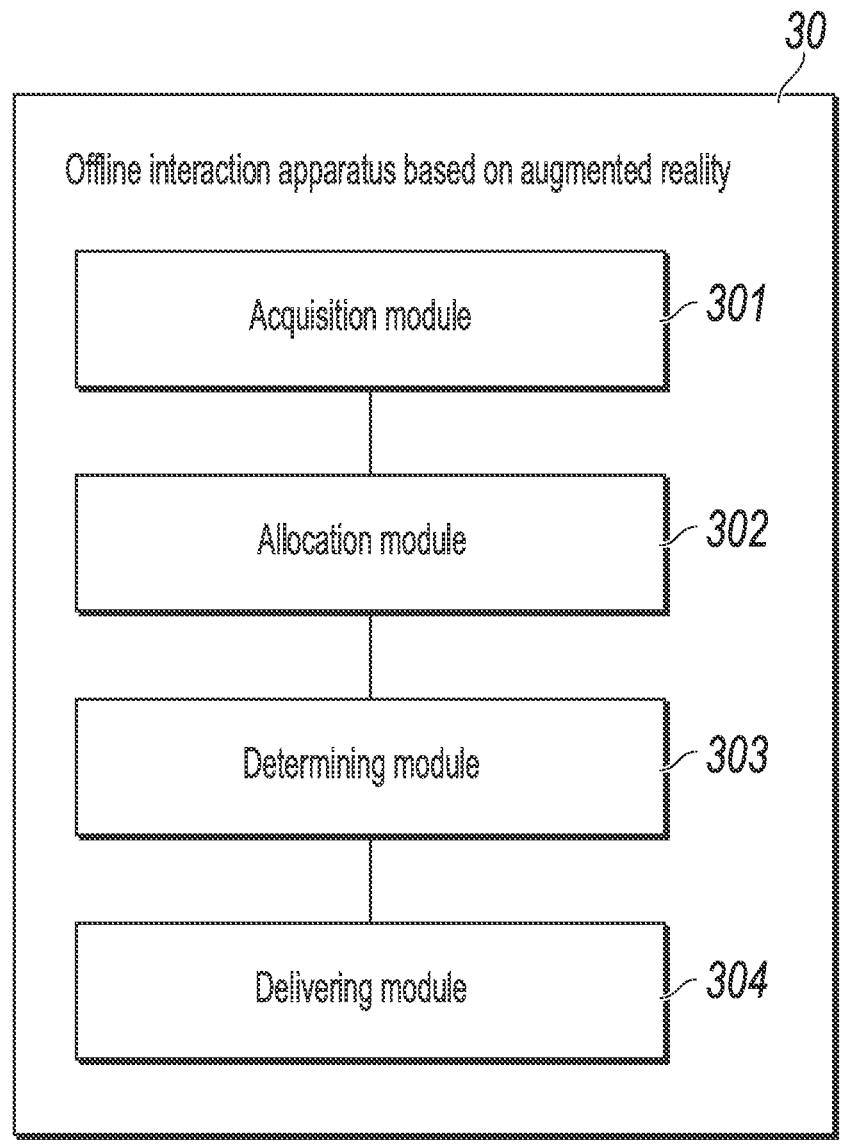
FIG. 3 is a logical block diagram illustrating an offline interaction apparatus based on augmented reality, according to an implementation of the present application.
Figure 4:
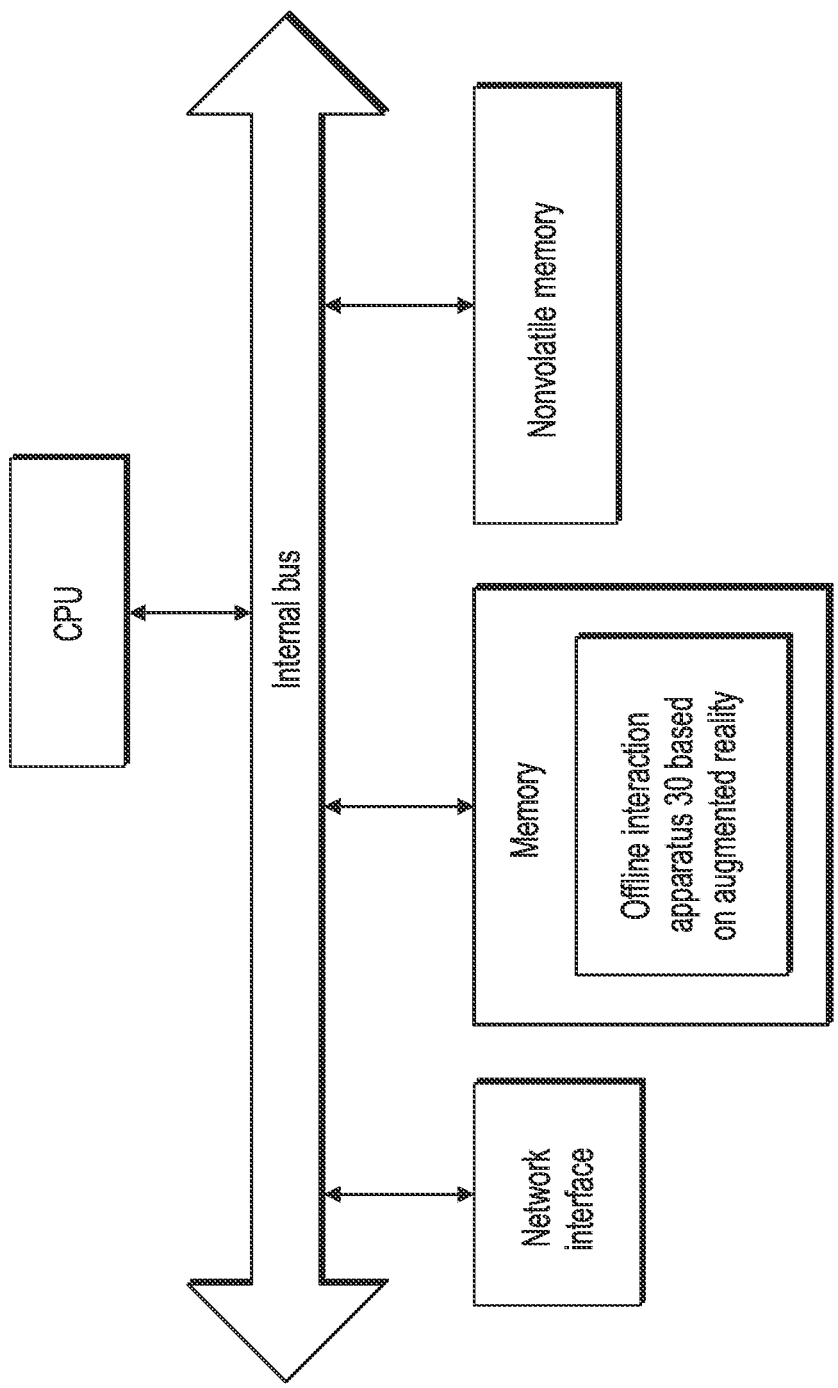
FIG. 4 is a diagram illustrating a hardware structure of an augmented reality server including an offline interaction apparatus based on augmented reality, according to an implementation of the present application.

Referring to FIG. 3, the present application provides an offline interaction apparatus 30 based on augmented reality, and the apparatus is applied to an AR server. Referring to FIG. 4, a hardware architecture of the AR server including the offline interaction apparatus 30 based on augmented reality generally includes a CPU, a memory, a nonvolatile memory, a network interface, an internal bus, etc. In an example in which the offline interaction apparatus 30 based on augmented reality is implemented by software, the offline interaction apparatus 30 based on augmented reality usually can be understood as a computer program loaded in the memory, and forms a logical software and hardware combined apparatus after execution by the CPU. The apparatus 30 includes the following: an acquisition module 301, configured to obtain consumption data of a user at a target place, where the consumption data includes a consumption amount; an allocation module 302, configured to allocate a corresponding quantity of virtual resources to the user based on the consumption amount, and accumulate the allocated virtual resources to a virtual resource pool of the target place; a determining module 303, configured to: in response to an image scanning operation performed by an augmented reality client device in an offline environment of the target place, determine whether a predetermined identifier corresponding to the target place is identified from image information obtained through scanning; and a delivering module 304, configured to: in response to determining that the predetermined identifier corresponding to the target place is identified from the image information obtained through scanning, deliver virtual data related to virtual resources in the virtual resource pool to the augmented reality client device, so that the augmented reality client device performs augmented display on the related virtual data at a location corresponding to the predetermined identifier in a scanned real-world image.

In the present example, the virtual data includes total value of the virtual resources in the virtual resource pool, unit value of the virtual resources in the virtual resource pool, and change data of the unit value.

The apparatus 30 further includes the following: a calculation module 305 (not shown in FIG. 3), configured to calculate the unit value of the virtual resources in the virtual resource pool based on a quantity of virtual resources in the virtual resource pool and total value to be allocated corresponding to the target place; record the change data of the unit value when the unit value of the virtual resources in the virtual resource pool changes; and calculate the total value of the virtual resources in the virtual resource pool based on the calculated unit value and the quantity of virtual resources in the virtual resource pool.

In the present example, the allocation module 302 is further configured to: receive a first virtual resource exchange request sent by the user by using the augmented reality client device, where the first virtual resource exchange request includes a quantity of virtual resources to be exchanged and identification information of the virtual resources to be exchanged by the user; calculate total value of the virtual resources to be exchanged based on the first virtual resource exchange request; and allocate virtual vouchers having the same total value as the virtual resources to be exchanged to the user; and receive a second virtual resource exchange request sent by the user by using the augmented reality client device, where the second virtual resource exchange request includes a quantity of virtual vouchers to be exchanged by the user; calculate a quantity of virtual resources having the same total value as the virtual vouchers to be exchanged based on the second virtual resource exchange request; and allocate the corresponding quantity of virtual resources to the user.

In the present example, the virtual resource is a virtual asset corresponding to the target place, the total value to be allocated is total revenue of the target place, a virtual voucher is virtual currency, a first virtual resource exchange request is a virtual asset purchase request, and a second virtual resource exchange request is a virtual asset selling request.

Figure 5:
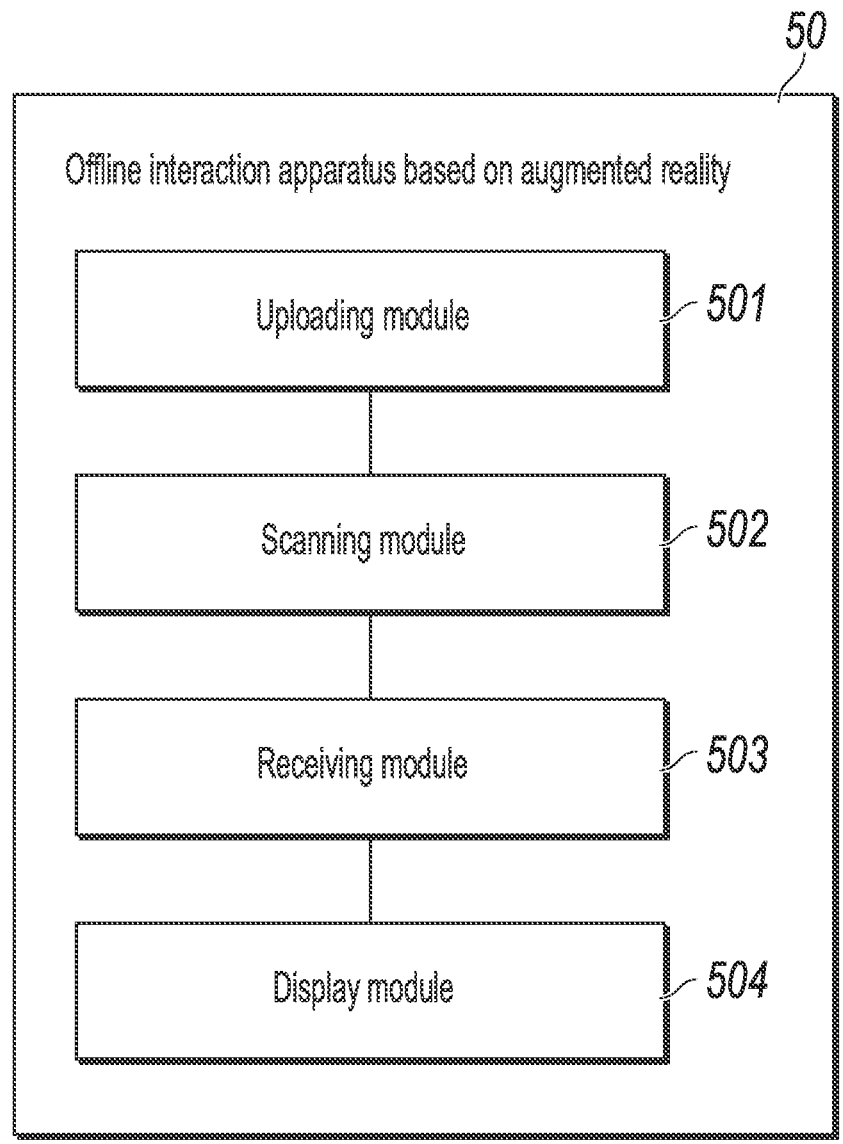
FIG. 5 is a logical block diagram illustrating another offline interaction apparatus based on augmented reality, according to an implementation of the present application.
Figure 6:
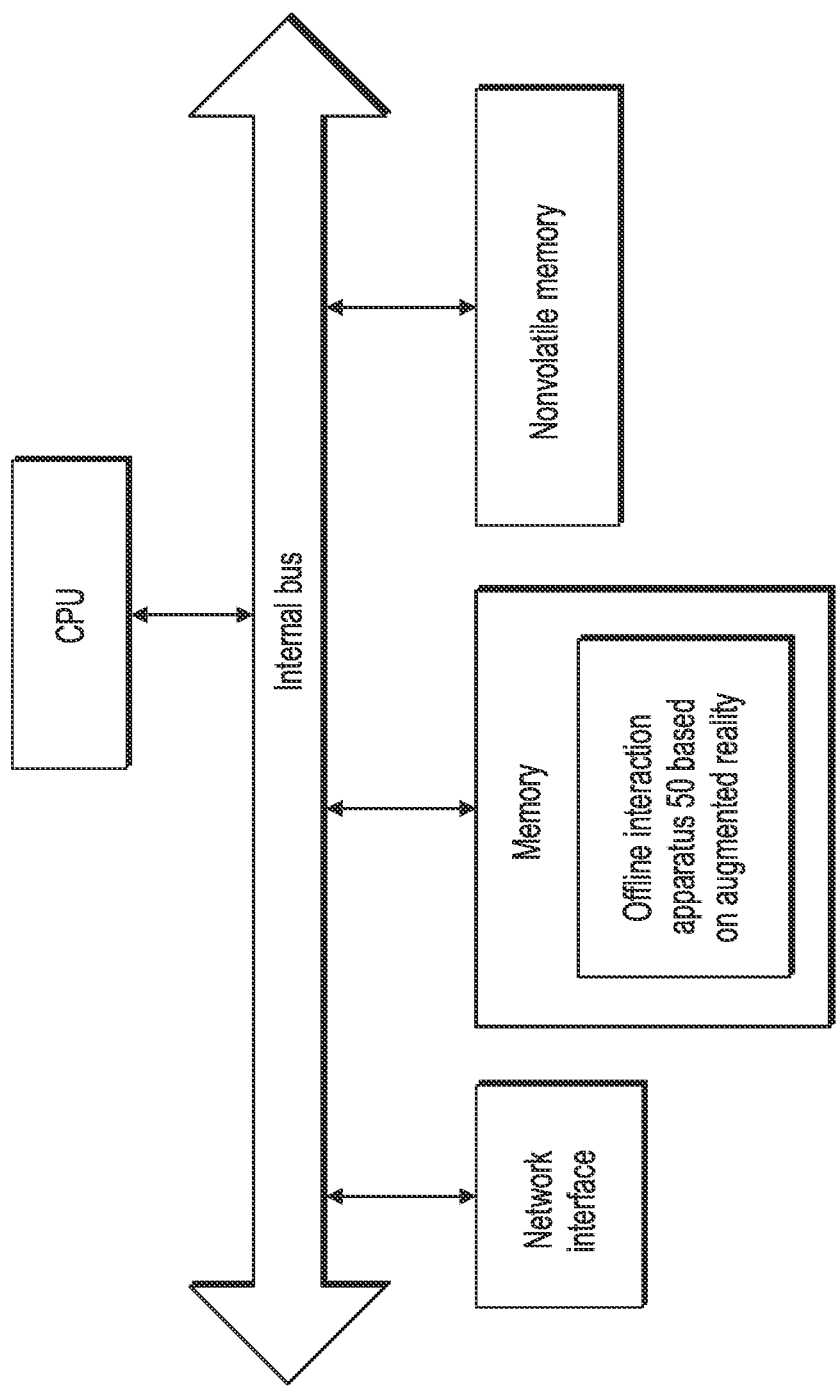
FIG. 6 is a diagram illustrating a hardware structure of an augmented reality client device including another offline interaction apparatus based on augmented reality, according to an implementation of the present application.

Referring to FIG. 5, the present application provides an offline interaction apparatus 50 based on augmented reality, and the apparatus is applied to an AR client device. Referring to FIG. 6, a hardware architecture of the AR client device including the offline interaction apparatus 50 based on augmented reality generally includes a CPU, a memory, a nonvolatile memory, a network interface, an internal bus, etc. In an example in which the offline interaction apparatus 50 based on augmented reality is implemented by software, the offline interaction apparatus 50 based on augmented reality usually can be understood as a computer program loaded in the memory, and forms a logical software and hardware combined apparatus after execution by the CPU. The apparatus 50 includes the following: an uploading module 501, configured to upload consumption data of a user at a target place to an augmented reality server, where the consumption data includes a consumption amount, so that the augmented reality server allocates a corresponding quantity of virtual resources to the user based on the consumption amount, and accumulates the allocated virtual resources to a virtual resource pool of the target place; a scanning module 502, configured to perform image scanning in an offline environment of the target place in response to an image scanning operation performed by the user in the offline environment of the target place; a receiving module 503, configured to initiate image recognition on image information obtained through scanning, and when a predetermined identifier corresponding to the target place is identified from the image information, receive virtual data that is delivered by the augmented reality server and that is related to virtual resources in the virtual resource pool; and a display module 504, configured to perform augmented display on the received virtual data at a location corresponding to the predetermined identifier in a scanned real-world image.

In the present example, the virtual data includes total value of the virtual resources in the virtual resource pool, unit value of the virtual resources in the virtual resource pool, and change data of the unit value.

The display module 504 is configured to: create a visual graph corresponding to a change rule of the unit value based on the received change data of the unit value; and perform augmented display on the received total value of the virtual resources in the virtual resource pool, the unit value of the virtual resources in the virtual resource pool, and the created visual graph at the location corresponding to the predetermined identifier in the scanned real-world image.

In the present example, a user interface of the augmented reality client device includes a first exchange entry and a second exchange entry corresponding to the virtual resources.

The apparatus further includes the following: a sending module 505, configured to send a first virtual resource exchange request to the augmented reality server in response to a trigger operation performed by the user on the first exchange entry, where the first virtual resource exchange request includes a quantity of virtual resources to be exchanged and identification information of the virtual resources to be exchanged by the user, so that the augmented reality server calculates total value of the virtual resources to be exchanged based on the first virtual resource exchange request, and allocates virtual vouchers having the same total value as the virtual resources to be exchanged to the user; and send a second virtual resource exchange request to the augmented reality server in response to a trigger operation performed by the user on the second exchange entry, where the second virtual resource exchange request includes a quantity of virtual vouchers to be exchanged by the user, so that the augmented reality server calculates a quantity of virtual resources having the same total value as the virtual vouchers to be exchanged based on the second virtual resource exchange request, and allocates the corresponding quantity of virtual resources to the user.

In the present example, the virtual resource is a virtual asset corresponding to the target place, a virtual voucher is virtual currency, a first virtual resource exchange request is a virtual asset purchase request, and a second virtual resource exchange request is a virtual asset selling request.

Because an apparatus implementation basically corresponds to a method implementation, for related parts, references can be made to related descriptions in the method implementation. The previously described apparatus implementation is merely an example. The units described as separate parts can or cannot be physically separate, and parts displayed as units can or cannot be physical units, can be located in one position, or can be distributed on a plurality of network units. Some or all of the modules can be selected as needed to achieve the objectives of the solutions in the present application. A person of ordinary skill in the art can understand and implement the implementations of the present application without creative efforts.

The system, apparatus, module, or unit described in the previous implementations can be implemented by using a computer chip or an entity, or implemented by a product with a certain function. A typical implementation device is a computer. The computer can be, for example, a personal computer, a laptop computer, a cellular phone, a camera phone, a smartphone, a personal digital assistant, a media player, a navigation device, an email device, a game console, a tablet computer, or a wearable device, or a combination of any of these devices.

A person skilled in the art can easily figure out another implementation of the present application after considering the present specification and practicing the present disclosure. The present application is intended to cover any variations, functions, or adaptive changes of the present application. These variations, functions, or adaptive changes comply with general principles of the present application, and include common knowledge or a commonly used technical means in the technical field that is not disclosed in the present application. The present specification and the implementations are merely considered as examples. The actual scope and the spirit of the present application are described by the following claims.

It should be understood that the present application is not limited to the earlier described accurate structures that are shown in the accompanying drawings, and modifications and changes can be made without departing from the scope of the present application. The scope of the present application is limited only by the appended claims.

Figure 7:
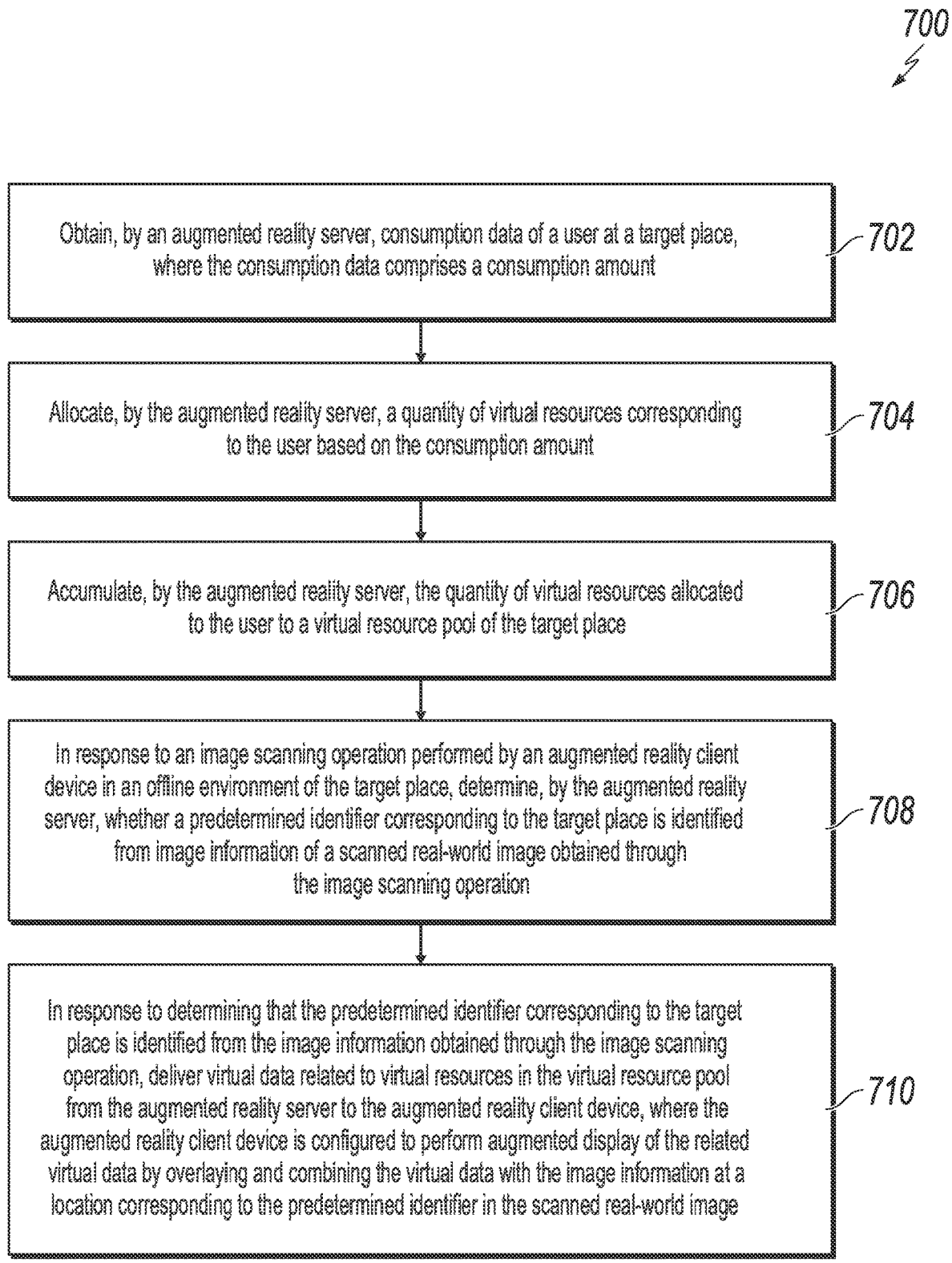
FIG. 7 is a flowchart illustrating an example of a computer-implemented method for delivering virtual data to an augmented reality client device, according to an implementation of the present disclosure.

The previous descriptions are merely examples of implementations of the present application, but are not intended to limit the present application. Any modification, equivalent replacement, or improvement made without departing from the spirit and principle of the present application should fall within the protection scope of the present application.

FIG. 7 is a flowchart illustrating an example of a computer-implemented method 700 for delivering virtual data to an augmented reality client device, according to an implementation of the present disclosure. For clarity of presentation, the description that follows generally describes method 700 in the context of the other figures in this description. However, it will be understood that method 700 can be performed, for example, by any system, environment, software, and hardware, or a combination of systems, environments, software, and hardware, as appropriate. In some implementations, various steps of method 700 can be run in parallel, in combination, in loops, or in any order.

At 702, consumption data of a user at a target place is obtained by an augmented reality server, where the consumption data comprises a consumption amount. For example, the acquisition module 301 can obtain consumption data of a user at a target place, such as a shop, while the user is wearing an augmented reality (AR) device. The AR server can be, for example, a payment platform that networks with payment applications in use by users at different locations. From 702, method 700 proceeds to 704.

At 704, a quantity of virtual resources corresponding to the user are allocated by the augmented reality server based on the consumption amount. In some implementations, virtual resources can be associated with purchase and selling (or sales) requests. For example, the virtual resource can be a virtual asset (such as stocks, bonds, or options) corresponding to the target place. A total value to be allocated can include, for example, a total revenue of the target place, including the total revenue received through sales of stocks, bonds, or options. A virtual voucher can include a virtual currency. A first virtual resource exchange request can include a virtual asset purchase request, such as a request to purchase a number of shares of stocks, bonds, or options. A second virtual resource exchange request can include a virtual asset selling request. As an example, the user may buy a certain quantity of virtual stocks, virtual bonds, virtual options, other forms of virtual assets at a shop that sells the assets. The allocation module 302, for example, can allocate a corresponding quantity of virtual resources to the user based on the consumption amount (for example, a purchase quantity). The allocation module 302 can accumulate the allocated virtual resources to a virtual resource pool of the target place. From 704, method 700 proceeds to 706.

At 706, the quantity of virtual resources allocated to the user are accumulated, by the augmented reality server, to a virtual resource pool of the target place. The allocation module 302, for example, can accumulate the allocated virtual resources (for example, a certain quantity of virtual stocks, virtual bonds, virtual options, other forms of virtual assets) to a virtual resource pool of the target place, such as a shop. From 706, method 700 proceeds to 708.

At 708, in response to an image scanning operation performed by an augmented reality client device in an offline environment of the target place, a determination is made by the augmented reality server whether a predetermined identifier (ID) corresponding to the target place is identified from image information of a scanned real-world image obtained through the image scanning operation. For example, the AR server can allocate a unique shop ID to each cooperating (for example, subscribing) offline shop in a system, and chain shops of the same brand can be distinguished by using different shop IDs. The user can scan a specific identifier (such as a shop logo) of the offline shop by using the AR client device. The AR client device can initiate image recognition on image information obtained through scanning. The determining module 303, for example, can determine whether a predetermined identifier (such as the shop logo) corresponding to the target place is identified from image information obtained through scanning. From 708, method 700 proceeds to 710.

At 710, in response to determining that the predetermined identifier corresponding to the target place is identified from the image information obtained through the image scanning operation, virtual data related to the virtual resources in the virtual resource pool is delivered from the augmented reality server to the augmented reality client device. For example, the virtual data can include a total value of the virtual resources in the virtual resource pool, a unit value of the virtual resources in the virtual resource pool, and change data of the unit value. The augmented reality client device is configured to perform augmented display of the related virtual data by overlaying and combining the virtual data with the image information at a location corresponding to the predetermined identifier in the scanned real-world image. For example, in response to determining that the predetermined identifier corresponding to the target place is identified from the image information obtained through scanning, the delivering module 304 can deliver virtual data related to virtual resources in the virtual resource pool to the augmented reality client device. Then, the augmented reality client device can perform augmented display on the related virtual data at a location corresponding to the predetermined identifier in a scanned real-world image. After 710, method 700 can stop.

In some implementations, method 700 can further include calculating the total value of the virtual resources in the virtual resource pool based on the calculated unit value and the quantity of virtual resources in the virtual resource pool. For example, the unit value of the virtual resources in the virtual resource pool can be calculated based on a quantity of virtual resources in the virtual resource pool and the total value to be allocated corresponding to the target place. The change data of the unit value can be recorded when the unit value of the virtual resources in the virtual resource pool changes. Then, the total value of the virtual resources in the virtual resource pool can be calculated based on the calculated unit value and the quantity of virtual resources in the virtual resource pool.

In some implementations, method 700 can further include allocating, by the augmented reality server, the corresponding quantity of virtual resources to the user. For example, a first virtual resource exchange request sent by the user by using the augmented reality client device can be received by the augmented reality server. The first virtual resource exchange request can include a quantity of virtual resources to be exchanged and identification information of the virtual resources to be exchanged by the user. A total value of the virtual resources to be exchanged can be calculated by the augmented reality server based on the first virtual resource exchange request. Virtual vouchers having a same total value as the total value of the virtual resources to be exchanged can be allocated to the user by the augmented reality server. A second virtual resource exchange request sent by the user by using the augmented reality client device can be received by the augmented reality server, where the second virtual resource exchange request includes a quantity of virtual vouchers to be exchanged by the user. A quantity of virtual resources having the same total value as a value of the quantity of virtual vouchers to be exchanged can be calculated by the augmented reality server based on the second virtual resource exchange request. The corresponding quantity of virtual resources can be allocated, by the augmented reality server, to the user.

In some implementations, method 700 can further include accumulating virtual resources of different users and horizontally comparing and analyzing total quantities of the virtual resources accumulated in virtual resource pools of different target places. For example, virtual resources allocated to different users in the virtual resource pool of the target place can be accumulated by the augmented reality server. The virtual resource pool can include a virtual asset pool created for the target place, and the virtual resources allocated to the different users can be accumulated in the virtual resource pool. An offline target place can be selected, by the augmented reality server, by horizontally comparing and analyzing total quantities of the virtual resources accumulated in virtual resource pools of different target places.

The present disclosure relates to augmented reality technology-based interaction between a client device and an augmented reality server. Virtual data is created for virtual resources that are allocated online at the augmented reality server for a user. The client device is configured to perform augmented display of the related virtual data by overlaying and combining the virtual data with the image information at a scanned image at the client device. An advantage of the method and the apparatus is that communication between a server and a client device is improved, and an augmented display of data on an offline-taken image is provided with pushed virtual data from an augmented reality server. The augmented display on the client device is available for receiving user interactions, such as user requests.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method for providing virtual resource information to an augmented reality (AR) client device, the method comprising:
   providing, by the AR client device of a user to an AR server, consumption data of the user at a real-world target place;
   computing, by the AR server, a first quantity of virtual resources corresponding to a consumption amount represented in the consumption data of the user;
   updating, by the AR server, virtual data maintained by the AR server for the real-world target place including adding the first quantity of virtual resources corresponding to the consumption amount to an overall quantity of virtual resources for the real-world target place to generate an updated overall quantity of virtual resources contributed by a plurality of users to a virtual resource pool maintained by the AR server for the real-world target place, the plurality of users including the user of the AR client device and a plurality of other users;
   obtaining, by the AR client device, an image of the real-world target place;
   performing, by the AR client device, an image scanning operation on the image of the real-world target place;
   determining, by the AR client device, an identifier of the real-world target place based on the image scanning operation;
   providing, by the AR client device to the AR server over a network, the determined identifier of the real-world target place;
   obtaining, by the AR server from the virtual data maintained by the AR server for the real-world target place and based on the determined identifier of the real-world target place, the updated overall quantity of virtual resources contributed by the plurality of users including the user of the AR client device and the plurality of other users to the virtual resource pool maintained by the AR server for the real-world target place;
   delivering, from the AR server to the AR client device, virtual data representing the updated overall quantity of virtual resources contributed by the plurality of users to the virtual resource pool maintained by the AR server for the real-world target place; and
   displaying, by the AR client device, a graphical representation of the delivered virtual data representing the updated overall quantity of virtual resources contributed by the plurality of users to the virtual resource pool maintained by the AR server for the real-world target place, including overlaying and combining one or more elements of the delivered virtual data with image information of the image of the real-world target place corresponding to the identifier determined from the image of the real-world target place.

2. The computer-implemented method of claim 1, wherein the virtual data maintained by the AR server for the real-world target place comprises a total value of the first quantity of virtual resources in the virtual resource pool, a unit value of the first quantity of virtual resources in the virtual resource pool, and change data of the unit value.

3. The computer-implemented method of claim 2, further comprising:
   calculating, by the AR server, the unit value of the first quantity of virtual resources in the virtual resource pool based on a quantity of the first quantity of virtual resources in the virtual resource pool and the total value of the first quantity of virtual resources in the virtual resource pool corresponding to the real-world target place; and
   recording, by the AR server, the change data of the unit value when the unit value of the first quantity of virtual resources in the virtual resource pool changes.

4. The computer-implemented method of claim 1, wherein a plurality of offline target places, including the real-world target place, correspond to respective virtual resource pools comprising virtual resources, and further comprising:
   selecting, by the AR server, an offline target place from the plurality of offline target places by comparing and analyzing total quantities of the virtual resources accumulated in the respective virtual resource pools corresponding to the plurality of offline target places.

5. The computer-implemented method of claim 4, wherein the respective virtual resource pools of the plurality of offline target places comprise respective virtual asset pools, and wherein the virtual resources in the respective virtual resource pools are virtual assets.

6. One or more non-transitory, computer-readable media storing one or more instructions that, when executed by a plurality of computer systems of an augmented reality (AR) client device and an AR server, cause the plurality of computer systems to perform operations comprising:

providing, by the AR client device of a user to the AR server, consumption data of the user at a real-world target place;

computing, by the AR server, a first quantity of virtual resources corresponding to a consumption amount represented in the consumption data of the user;

updating, by the AR server, virtual data maintained by the AR server for the real-world target place including adding the first quantity of virtual resources corresponding to the consumption amount to an overall quantity of virtual resources for the real-world target place to generate an updated overall quantity of virtual resources contributed by a plurality of users to a virtual resource pool maintained by the AR server for the real-world target place, the plurality of users including the user of the AR client device and a plurality of other users;

obtaining, by the AR client device, an image of the real-world target place;

performing, by the AR client device, an image scanning operation on the image of the real-world target place;

determining, by the AR client device, an identifier of the real-world target place based on the image scanning operation;

providing, by the AR client device to the AR server over a network, the determined identifier of the real-world target place;

obtaining, by the AR server from the virtual data maintained by the AR server for the real-world target place and based on the determined identifier of the real-world target place, the updated overall quantity of virtual resources contributed by the plurality of users including the user of the AR client device and the plurality of other users to the virtual resource pool maintained by the AR server for the real-world target place;

delivering, from the AR server to the AR client device, virtual data representing the updated overall quantity of virtual resources contributed by the plurality of users to the virtual resource pool maintained by the AR server for the real-world target place; and displaying, by the AR client device, a graphical representation of the delivered virtual data representing the updated overall quantity of virtual resources contributed by the plurality of users to the virtual resource pool maintained by the AR server for the real-world target place, including overlaying and combining one or more elements of the delivered virtual data with image information of the image of the real-world target place corresponding to the identifier determined from the image of the real-world target place.

7. The one or more non-transitory, computer-readable media of claim 6, wherein the virtual data maintained by the AR server for the real-world target place comprises a total value of the first quantity of virtual resources in the virtual resource pool, a unit value of the first quantity of virtual resources in the virtual resource pool, and change data of the unit value.

8. The one or more non-transitory, computer-readable media of claim 7, the operations further comprising:

calculating, by the AR server, the unit value of the first quantity of virtual resources in the virtual resource pool based on a quantity of the first quantity of virtual resources in the virtual resource pool and the total value of the first quantity of virtual resources in the virtual resource pool corresponding to the real-world target place; and recording, by the AR server, the change data of the unit value when the unit value of the first quantity of virtual resources in the virtual resource pool changes.

9. The one or more non-transitory, computer-readable media of claim 6, wherein a plurality of offline target places, including the real-world target place, correspond to respective virtual resource pools comprising virtual resources, the operations further comprising:

selecting, by the AR server, an offline target place from the plurality of offline target places by comparing and analyzing total quantities of the virtual resources accumulated in the respective virtual resource pools corresponding to the plurality of offline target places.

10. The one or more non-transitory, computer-readable media of claim 9, wherein the respective virtual resource pools of the plurality of offline target places comprise respective virtual asset pools, and wherein the virtual resources in the respective virtual resource pools are virtual assets.

11. A computer-implemented system, comprising:

an augmented reality (AR) server and an AR client device; and one or more computer memory devices interoperably coupled with one or more of the AR server and the AR client device and storing one or more instructions that, when executed, cause the AR server and the AR client device to perform operations comprising:

providing, by the AR client device of a user to an AR server, consumption data of the user at a real-world target place;

computing, by the AR server, a first quantity of virtual resources corresponding to a consumption amount represented in the consumption data of the user;

updating, by the AR server, virtual data maintained by the AR server for the real-world target place including adding the first quantity of virtual resources corresponding to the consumption amount to an overall quantity of virtual resources for the real-world target place to generate an updated overall quantity of virtual resources contributed by a plurality of users to a virtual resource pool maintained by the AR server for the real-world target place, the plurality of users including the user of the AR client device and a plurality of other users;

obtaining, by the AR client device, an image of the real-world target place;

performing, by the AR client device, an image scanning operation on the image of the real-world target place;

determining, by the AR client device, an identifier of the real-world target place based on the image scanning operation;

providing, by the AR client device to the AR server over a network, the determined identifier of the real-world target place;

obtaining, by the AR server from the virtual data maintained by the AR server for the real-world target place and based on the determined identifier of the real-world target place, the updated overall quantity of virtual resources contributed by the plurality of users including the user of the AR client device and the plurality of other users to the virtual resource pool maintained by the AR server for the real-world target place;

delivering, from the AR server to the AR client device, virtual data representing the updated overall quantity of virtual resources contributed by the plurality of users to the virtual resource pool maintained by the AR server for the real-world target place; and displaying, by the AR client device, a graphical representation of the delivered virtual data representing the updated overall quantity of virtual resources contributed by the plurality of users to the virtual resource pool maintained by the AR server for the real-world target place, including overlaying and combining one or more elements of the delivered virtual data with image information of the image of the real-world target place corresponding to the identifier determined from the image of the real-world target place.

12. The computer-implemented system of claim 11, wherein the virtual data maintained by the AR server for the real-world target place comprises a total value of the first quantity of virtual resources in the virtual resource pool, a unit value of the first quantity of virtual resources in the virtual resource pool, and change data of the unit value.

13. The computer-implemented system of claim 12, the operations further comprising:

calculating, by the AR server, the unit value of the first quantity of virtual resources in the virtual resource pool based on a quantity of the first quantity of virtual resources in the virtual resource pool and the total value of the first quantity of virtual resources in the virtual resource pool corresponding to the real-world target place; and recording, by the AR server, the change data of the unit value when the unit value of the first quantity of virtual resources in the virtual resource pool changes.

14. The computer-implemented system of claim 11, wherein a plurality of offline target places, including the real-world target place, correspond to respective virtual resource pools comprising virtual resources, and the operations further comprising:

selecting, by the AR server, an offline target place from the plurality of offline target places by comparing and analyzing total quantities of the virtual resources accumulated in the respective virtual resource pools corresponding to the plurality of offline target places.

15. The computer-implemented system of claim 14, wherein the respective virtual resource pools of the plurality of offline target places comprise respective virtual asset pools, and wherein the virtual resources in the respective virtual resource pools are virtual assets.

* * * * *